Sept. 5, 1944.  M. W. GAISER  2,357,512
TESTING MACHINE
Filed Sept. 17, 1941  3 Sheets-Sheet 1

Inventor
Martin W. Gaiser
By Blackmor, Spencer & Hirt
Attorneys

Sept. 5, 1944.    M. W. GAISER    2,357,512
TESTING MACHINE
Filed Sept. 17, 1941    3 Sheets-Sheet 2

Inventor
Martin W. Gaiser
By
Blackmor, Spencer & Flint
Attorneys

Sept. 5, 1944.　　　M. W. GAISER　　　2,357,512
TESTING MACHINE
Filed Sept. 17, 1941　　　3 Sheets-Sheet 3

Inventor
Martin W. Gaiser
By Blackmore, Spencer & Flint
Attorney

Patented Sept. 5, 1944

2,357,512

UNITED STATES PATENT OFFICE 2,357,512

TESTING MACHINE

Martin W. Gaiser, Kokomo, Ind., assignor to General Motors Corporation, Detroit, Mich., a corporation of Delaware Application September 17, 1941, Serial No. 411,115

9 Claims. (Cl. 209—72)

This invention relates to testing means and more particularly to means for testing the magnetic permeability of a part by comparison with a standard.

With the use of "permeability tuning" for radio receivers, namely, tuning by varying the inductance of the resonant tuning circuits of a receiver instead of the capacity thereof, has come comminuted iron cores for use with the inductance coils and whose insertion into the same causes the necessary inductance change to tune the receivers over the band. In order to have the receiver operate properly, the cores, before they are assembled, must be tested very carefully to see that their characteristics are correct and that they match satisfactorily. With any sizable production therefore, the accurate testing of these cores presents a problem.

It is an object of my invention to provide means for accurately testing core members used to vary inductance.

It is a further object of my invention to provide automatic means for rapidly and accurately testing cores.

It is a still further object of my invention to provide a core testing device which accurately tests the cores and then automatically sorts them into satisfactory and unsatisfactory matching groups.

With these and other objects in view, which will become apparent as the specification proceeds, the embodiments of my invention will be best understood by reference to the following specification and claims and the illustrations in the accompanying drawings, in which:

Figure 1:
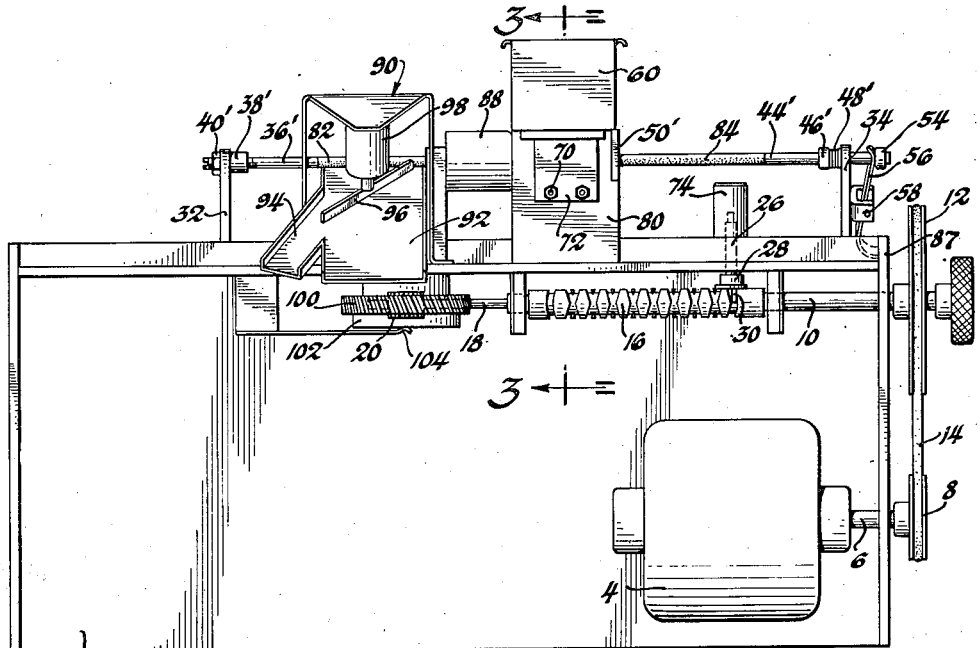
Fig. 1 is a front view of testing equipment embodying my invention.

Referring now more specifically to the drawings and in particular to Fig. 1, there is shown therein a base member 2, or casing, which carries therein a driving motor 4 upon the shaft 6 of which is mounted a pulley 8. Trunnioned in suitable supports above the motor is a second rotatable shaft 10 which carries a flywheel 12, and a belt 14 passes over both pulley 8 and flywheel 12 to cause the motor 4 to drive the shaft 10. To the shaft 10 is directly connected a spiral gear cam 16 and the outer end of the same is connected to a short shaft 18 upon which is mounted a worm gear 20.

The spiral cam gear is mounted thereon to transversely move a carriage means 22 which is mounted on the upper face of the casing 2 and is maintained in its proper alignment by suitable guide members 24 which are rigidly clamped in the case. A pin 26 is rigidly secured to the carriage means and has mounted upon its lower extremity a small disc 28 from which projects a small driving pin or cam follower 30 whose point projects down into the interstices of the spiral cam 16. Thus when the latter is rotated, the pin will be driven from one end to the other and then returned. In other words, the carriage will keep reciprocating back and forth upon continued rotation of the shaft 10 and flywheel 12.

Mounted upon the carriage 22, and at opposite ends thereof, are a plurality of supporting posts 32 and 34 which are adapted to support a plurality of longitudinally extending assemblies. In one of these assemblies, which are substantially identical, is provided a short brass rod 36 which is threaded into a short sleeve 38 and then proceeds through an opening in the support 32 and has a locking nut 40 applied to the outer face so that it clamps the support 32 between the internally threaded sleeve 38 and the nut 40. By adjusting the position of the end of the shaft 36 within the sleeve, a micrometer longitudinal adjustment of this member may be obtained. Connected to the end of the shaft 36, preferably by an internal stud, not shown, is a Bakelite rod 42 which extends over substantially one-half of the distance between the two supports.

Figure 2:
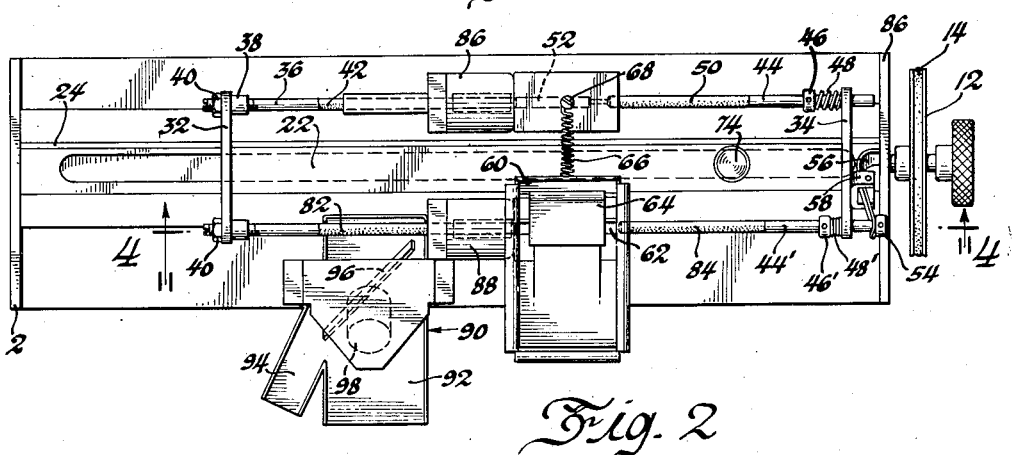
Fig. 2 is a top plan view of the device shown in Fig. 1.

A similar construction is provided on the opposite end of the carriage in that a short shaft 44 is placed through an opening in the upper end of the support 34 and has attached thereto a collar 46 by a set screw. However, in this case there is compressed between this collar and the upper end of the support 34 a small coil spring 48 which tends to bias the rod 44 toward the left as shown in Figs. 1 and 2. Secured to the end of the shaft 44 is a second Bakelite rod 50 which extends toward the first Bakelite rod 42 and is in alignment therewith, but spaced therefrom. These two rods are adapted to clamp between them a standard core 52 of the type to be tested. It might be mentioned at this point that these cores are small cores formed of comminuted material, compressed to a high degree, which are used for permeability tuning in radio receivers, although any other type of core which it is desired to use for altering the inductance for any purpose could be used and we do not wish to be limited to the use for high frequency only. This standard core will remain in this position at all times for a single run of cores, but can be removed when it is desired to test another type by merely forcing shaft 44 to the right, compressing spring 48 and removing the core and replacing it with another desired one.

The second supporting assembly which is to be used for supporting the core to be tested is substantially the same as that already described except that in this instance the shaft 44' at the right extremity, as shown in Fig. 2, extends further beyond the support 34 and has applied thereto a second collar 54, and also between the collar and the support 34 there is slipped over the shaft, before the collar is applied, one end of a spring lever 56 which is pivoted in bracket 58 suspended from one side of the support 34. The opposite end of the lever 56 is curved and adapted to engage a certain flange for ejection, to be described. When this carriage is in its extreme right-hand position, the space between the two Bakelite rods on the front clamping assembly lies directly under a hopper 60 into which the various cores to be tested are placed prior to operation, which cores will automatically align themselves to be fed down singly through a slot 62 adjacent the lower edge of the hopper.

Figure 3:
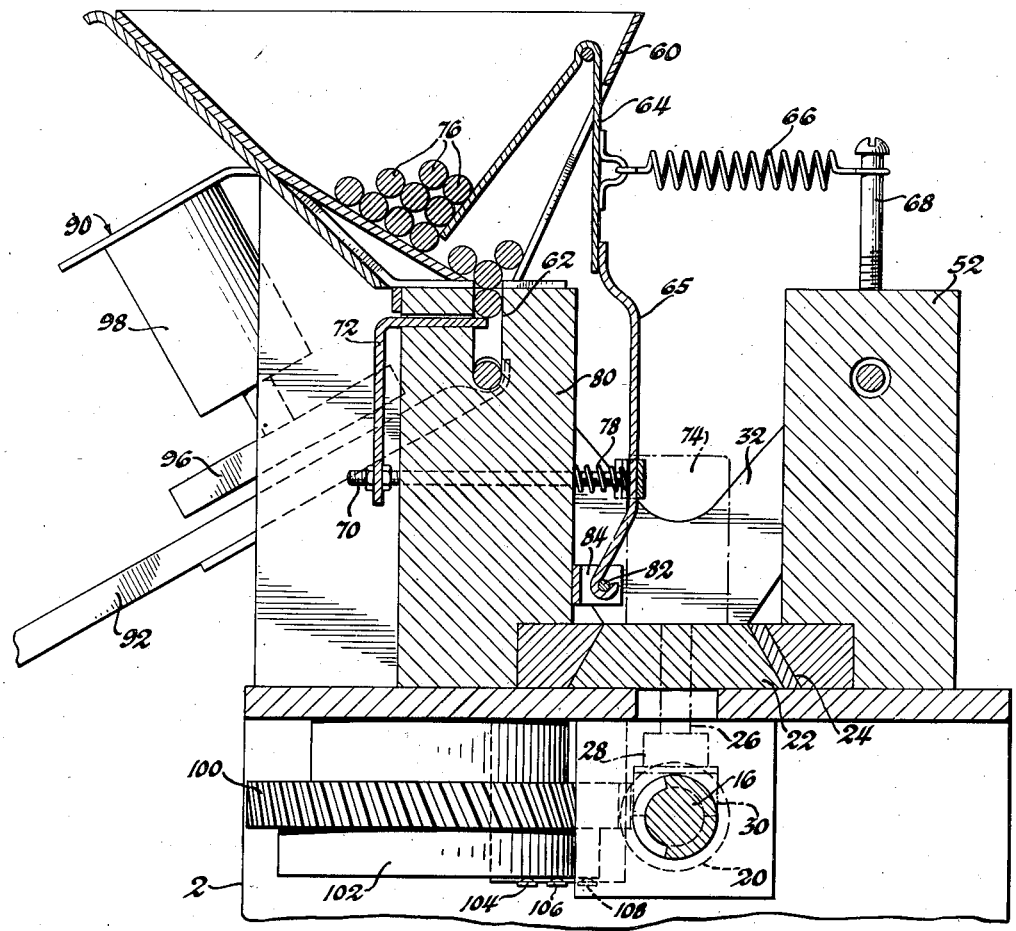
Fig. 3 is an enlarged sectional view taken on line 3—3 of Fig. 1.

There is also provided an agitating lever 64 to keep the cores from sticking or remaining in the hopper, which is spring biased by spring 66 connected to a pin 68 supported on the housing, and which is moved by a cam 74 carried by the movable carriage as it reciprocates past the lever 65 which contacts lever 64. Also connected to this lever 65 through a long pin 70 is an L-shaped lever 72 which acts as a unit feed stop for the cores as they proceed down through the slot 62. Thus as the cam 74 passes the arm 65, it will force it to the left, as shown in Fig. 3, causing the bellcrank 64 to agitate the cores 76 to be tested and at the same time cause the L-shaped lever to be moved to the left and allow one core to fall to a position between the ends of the Bakelite rods to be clamped for test. It might also be mentioned that there is a second coil spring 78 mounted between the lever 65 and the block 80 to assist spring 66 in its restoring action after the cam 74 has passed. The lever 65 is pivoted at 82 to a bracket 84 on the side of the block 80.

Figure 4:
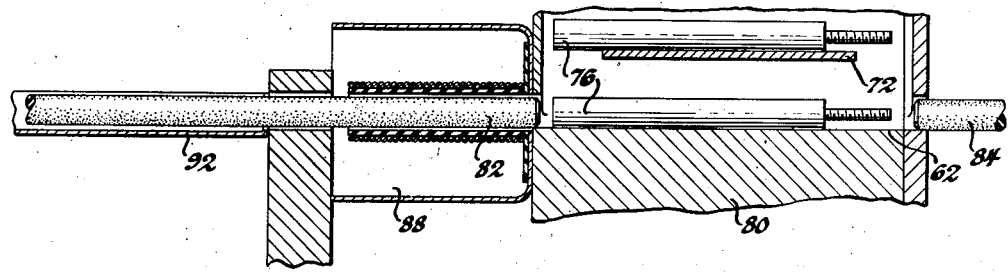
Fig. 4 is an enlarged sectional view taken on line 4—4 of Fig. 2 showing the loading of the core to be tested into clamping position.

When the core has assumed a position in which it may be clamped between the Bakelite rods, its position is best illustrated in Fig. 4 where the core 76 to be tested lies in the bottom of the groove 62 in block 80 between the end of Bakelite rods 82 and 84 before any clamping pressure has been applied. The Bakelite rod 84 is pulled to the right by the engagement of the end of the lever 56 with a flange 87 on the casing. However, as soon as the carriage begins to move toward the left, the lever 56 will be disengaged from the flange and the spring 48' will cause the rod 44' and the Bakelite rod 84 connected thereto to move to the left to grip the core to be tested between the two Bakelite ends. As the carriage continues to move, the core 76 will be moved to the left and of course at the same time the standard core 52 will also be moving simultaneously. The two cores must be in exact transverse alignment and this may be initially adjusted by adjusting sleeve 38 and nut 40 as previously explained. The cores will then be gradually moved into two coil assemblies 86 and 88 at the same time, thus changing the inductance of each of these coils simultaneously, and, if the core to be tested is satisfactory, identically.

The carriage then proceeds to the left, passing the core entirely through the coil and reaching a point adjacent the upper end of a discharge trough 90 which has two spouts 92 and 94. The release of the core being tested is accomplished by the collar 46' contacting the side plate 50' of the block 80 to cause Bakelite rod 84 to stop and spring 48' to be compressed upon further carriage movement. Mounted directly above the chute is a gate 96 which, if in its lower position, causes the cores to be discharged from spout 94, and, if in its raised position, will allow the cores to be discharged through spout 92. This gate is connected to a solenoid 98 which controls its actuation. If deenergized, the gate is down, and if energized, the gate is up out of the way.

The worm 20 driven by the projecting end of the shaft 18 drives a worm wheel 100 which in turn drives a drum 102 having sections of insulating and conductive material which cooperate with a plurality of switch levers 104, 106 and 108 to close or open various switches which will be described more in detail when the circuit diagram is reached. Let it be sufficient to say at this time that it is desired only to have the electrical system energized when the core is within the coil, and to be deenergized at other times. This timing cam controls this feature.

Figure 5:
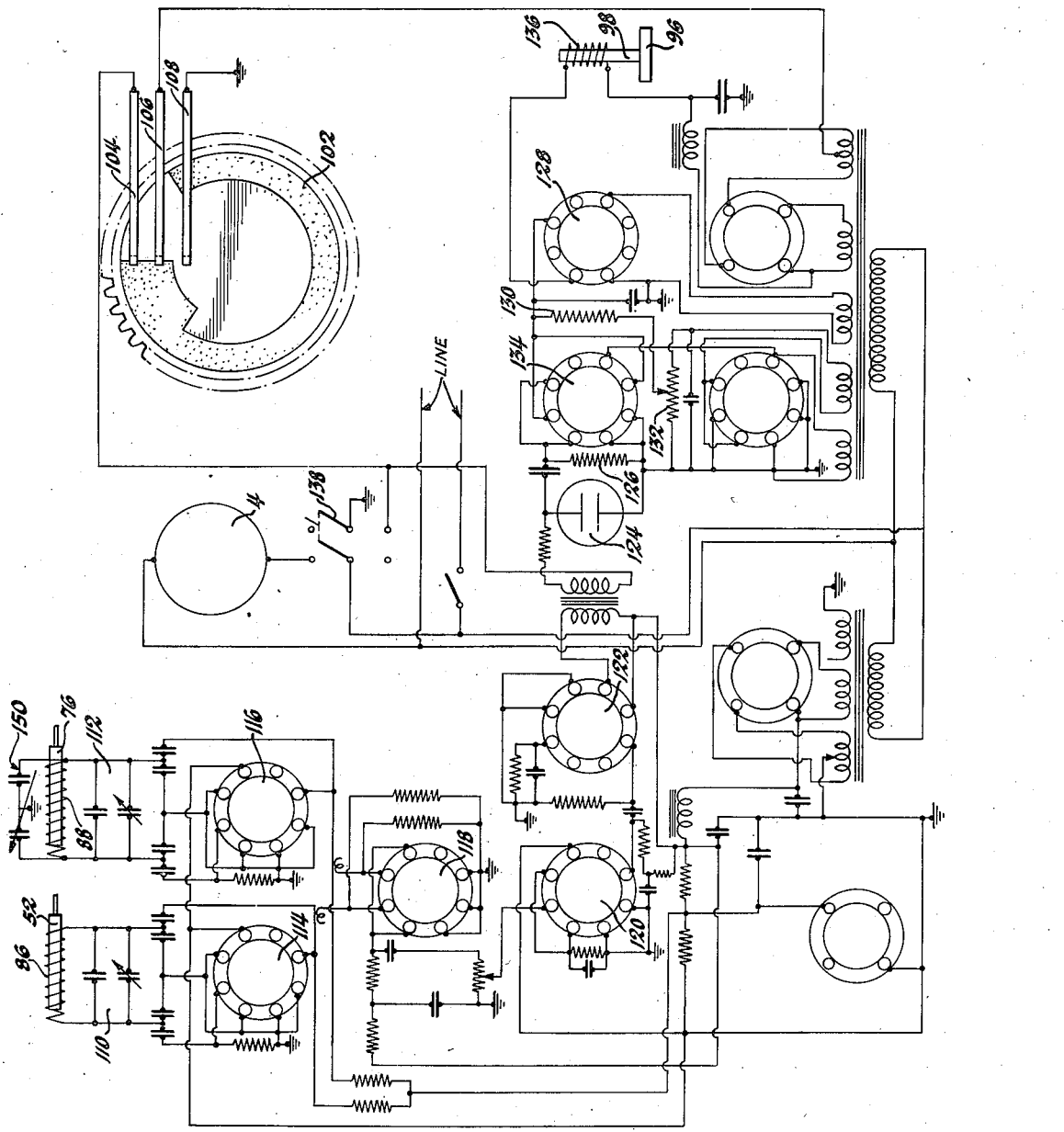
Fig. 5 is the schematic wiring diagram of the electrical system embodied in my device.

Referring now more specifically to Fig. 5, there is therein shown diagrammatically the two cores 52 and 76 with their associated coils 86 and 88, respectively. Each of these coils is connected into a resonant circuit 110 and 112, each of which is tuned by the insertion of the cores within the coils. An adjustment 150 is provided to initially align these circuits with two identical cores within the coils. These resonant circuits feed tubes 114 and 116, respectively, wherein the oscillations are amplified, and the input of each is then fed into a mixing tube 118. If the two frequencies are identical there will be no frequency difference, and therefore no output from the mixing tube. However, if the frequencies do vary, then the more the frequency difference the larger the output therefrom. In this particular device we have found that a difference of less than three kilocycles at any point will be a sufficient tolerance, but if the difference is more than that, the core should be rejected. The output from the mixing tube is then fed into successive amplifiers 120 and 122, the output of which is then developed across a neon voltage regulator 124 and resistance 126. In this manner the voltage across the tube 124 will remain substantially constant and that across the resistance 126 will vary directly with the frequency. This voltage difference may be measured by the tube 128 which is a gas triode or "Thyratron" tube which ordinarily is not conductive, but as the difference of potential generated across resistance 130 and resistance 132 varies and become less and less negative with respect to the ground due to the increase in rectifying voltage from the rectifier tube 134, a point will be reached at which the Thyratron tube becomes conductive or ionizes and fires to conduct current to its plate. This allows current to flow in the plate circuit which includes the coil 136 of the solenoid 98 which will then raise the gate 96. Thus if the frequency difference in the circuit, including the core to be tested and that including the standard core, deviates beyond a predetermined limit, the chute will be raised to allow that particular core to be discarded.

The remainder of the apparatus illustrated in the lower portion of Fig. 5 is merely to supply the necessary voltages to the various portions of the apparatus and will not be described in detail. The main switch 138 controls the motor 4 and is connected as shown to the incoming line. There is also shown the drum cam 102 which cooperates with the conductive fingers 104, 106 and 108 which as before mentioned is driven from the shaft 18 to provide energization of the circuit only during the time the cores are passed through their associated coils and since they are driven by a common source will be in tuned relation.

It will be obvious that if a given core does not fall within the predetermined tolerances when checked with a given standard core, it may nevertheless be used with some other standard core of slightly different characteristics and it need not be discarded entirely. With the device of my invention, cores having substantially the same characteristics, or matching cores, can be obtained from a large group and these can then be returned to the hopper and again run through the machine when a different standard core is applied for a further series of matching cores. It will be obvious that the tolerances thus obtained are very close and that the device is entirely automatic and need only be filled with cores upon which to operate and will then carefully select those which are matching and can be placed in radio receivers.

I claim:

1. In a testing device, a hopper for storing cores to be tested, a transversely movable carriage mounted below the hopper, clamping means on the carriage to receive the cores as they are discharged from the hopper, a standard core carried by the carriage to move simultaneously with the core to be tested, a pair of substantially identical coils mounted in the paths of the standard and test core, respectively, means to compare the change of inductance in the two coils as the cores are fed thereinto, and discharge control means operated by the comparing means.

2. In a testing device, a movable carriage, means for supporting a standard core thereon, means for storing a supply of cores to be tested, means for clamping said test cores to the carriage singly and periodically, a pair of substantially identical coils, each in the path of movement of one of the cores, whereby the inductance of the coils will be changed as the carriage is moved to cause the cores to be simultaneously inserted in the coils, a pair of oscillating circuits in which the coils are connected, means to cause the two frequencies to be combined and means responsive to the output of the combining means to operate a selective discharge apparatus.

3. In a testing device, a movable member, a standard core and a core to be tested mounted on said member, a pair of substantially identical coils having appreciable length, each in the path of movement of one of the cores and into which the same may be gradually inserted to vary coil inductance, a tunable circuit for each coil whose frequency will incrementally change as the cores are simultaneously moved by the common supporting member, mixing means to compare the frequencies of the two circuits and means operable by the output of the mixing means to select the tested core as satisfactory or not.

4. In a testing device, a hopper for storing cores to be tested, a movable carriage, a standard core mounted on said carriage, clamping means to hold a test core from the hopper on said carriage so that the two cores may be moved simultaneously, a pair of substantially identical coils in the paths of the cores, resonant circuits for each coil, a common output circuit for the two resonant circuits wherein their frequencies may be compared means for releasing said clamping means, a solenoid operated by the output of the common circuit and a selective gate controlled by said solenoid.

5. In selecting mechanism, a casing, a reciprocable carriage mounted on the casing, means for driving the latter, a hopper to support parts to be tested for their electrical characteristics mounted adjacent the carriage, means for clamping the parts to the carriage at one end of its travel and releasing it at the opposite end, a sorting chute at the releasing end mounted on the casing, an inductance coil mounted between the hopper and the chute of substantial length and through which coil the part passes, and means for measuring the incremental change in the inductance coil as the part proceeds through the coil.

6. In selecting mechanism, a casing, a reciprocable carriage mounted on the casing, means for driving the latter, a hopper to support parts to be tested for their electrical characteristics mounted adjacent the carriage, means for clamping the parts to the carriage at one end of its travel and releasing it at the opposite end, a sorting chute at the releasing end mounted on the casing, an inductance coil mounted between the hopper and the chute of substantial length and through which coil the part passes, means for measuring the incremental change in the inductance coil as the part proceeds through the coil, and a stop guide in the chute to select certain discharge channels thereof.

7. In selecting mechanism, a casing, a reciprocable carriage mounted on the casing, means for driving the latter, a hopper to support parts to be tested for their electrical characteristics mounted adjacent the carriage, means for clamping a part to the carriage at one end of its travel and releasing it at the opposite end, a sorting chute at the releasing end mounted on the casing, an inductance coil mounted between the hopper and the chute of substantial length and through which coil the part passes, means for measuring the incremental change in the inductance coil as the part proceeds through the coil, a stop guide in the chute to select certain discharge channels thereof, and means actuated by said measuring means to control the position of the stop guide.

8. In selecting mechanism, a casing, a reciprocable carriage mounted on the casing, means for driving the latter, means to support and deliver parts to be tested to the carriage, a standard part carried by the carriage, a pair of coils of substantial length mounted on the casing in alignment with the paths of movement of the two parts and into which the same are gradually immersed to vary coil inductance, and means to compare the incremental change in inductance in each coil simultaneously, and sorting means operated by the output of the comparing means at any time the inductance changes vary.

9. In selecting means, a movable member, a standard core and a core to be tested mounted on said member, a pair of substantially identical coils whose axial length is substantial, each in the path of movement of one of the cores, a tunable circuit for each coil whose frequency will change over a predetermined range as the cores are simultaneously moved by the common supporting member to gradually immerse them within the coils and vary coil inductance, oppositely phased mixing means connected to the output of the tuned circuits whereby the outputs will cancel as the frequencies change like incremental amounts as the cores are simultaneously inserted, but will provide a combined output if they vary, the greater the variance the greater the output, and sorting means actuated by the combined output.

MARTIN W. GAISER.